Figure 1:
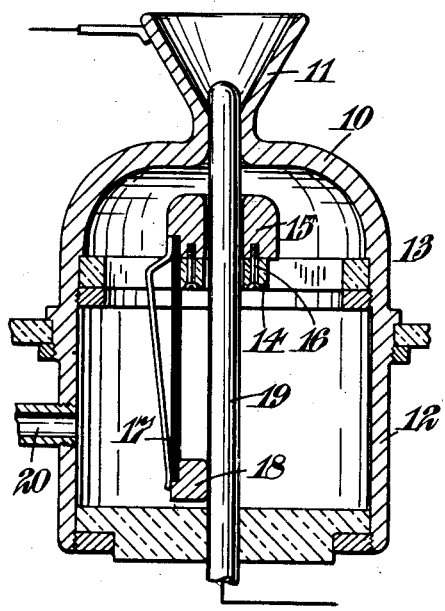

Jan. 15, 1935.  W. B. WHITNEY ET AL  1,987,885
ELECTRIC CIRCUIT BREAKER
Filed Feb. 28, 1933  5 Sheets-Sheet 1

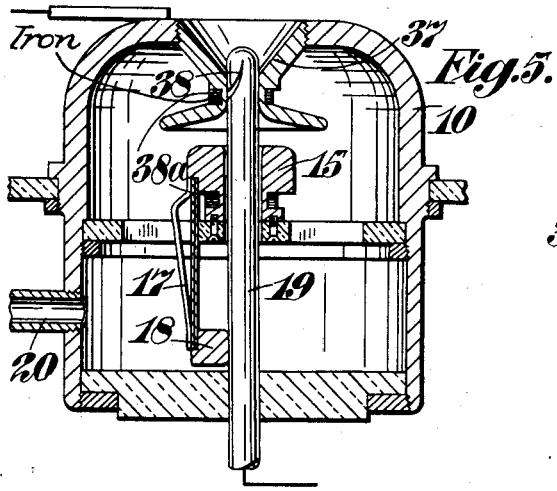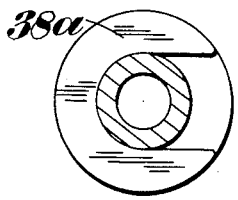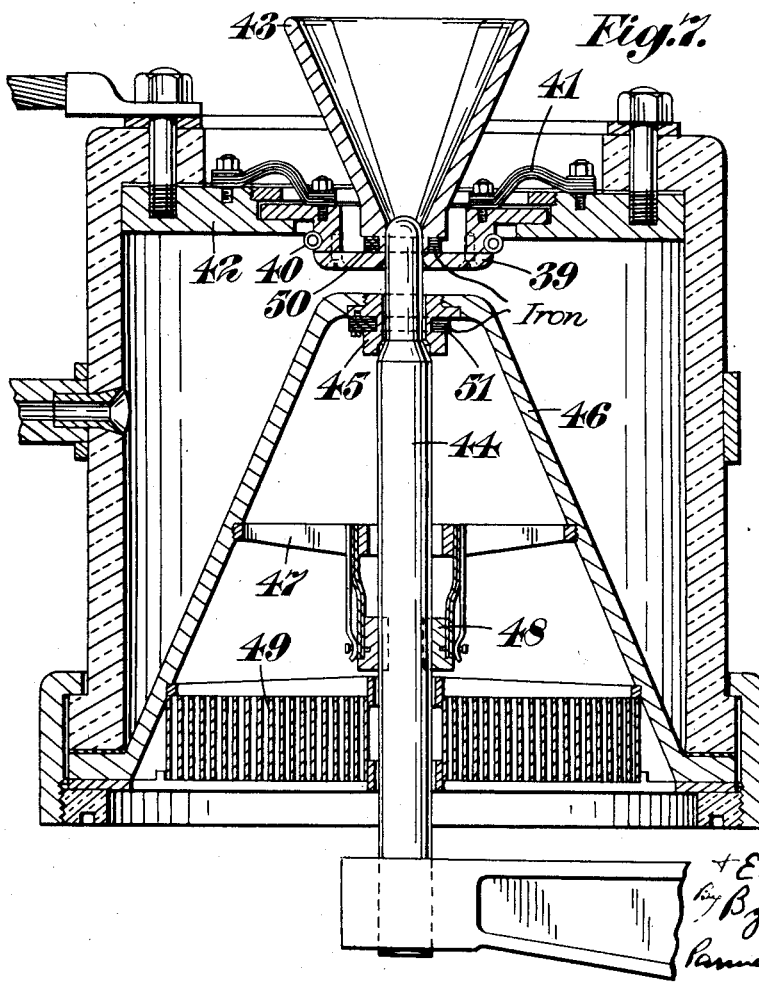

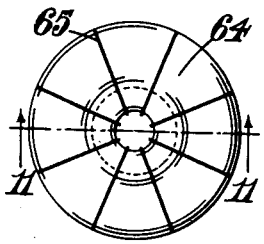
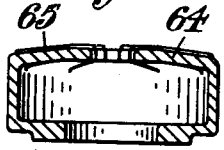
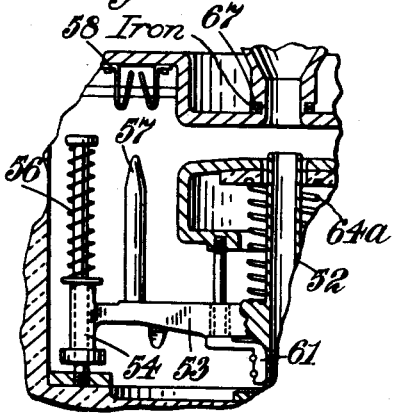
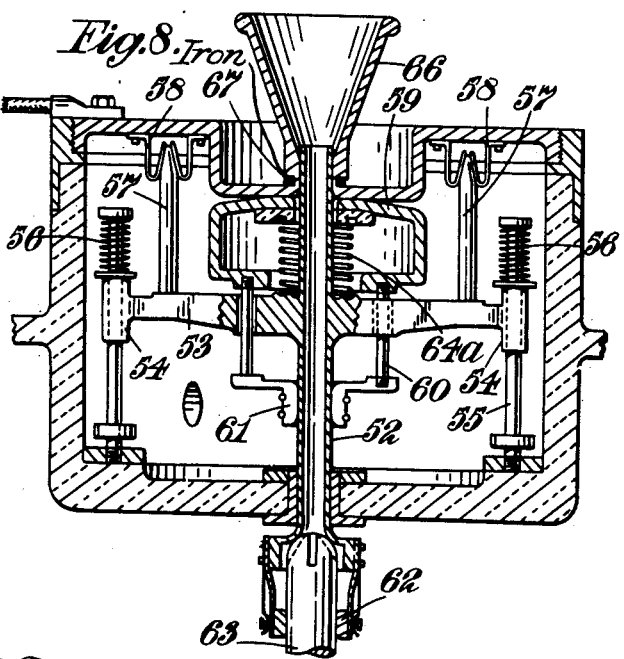
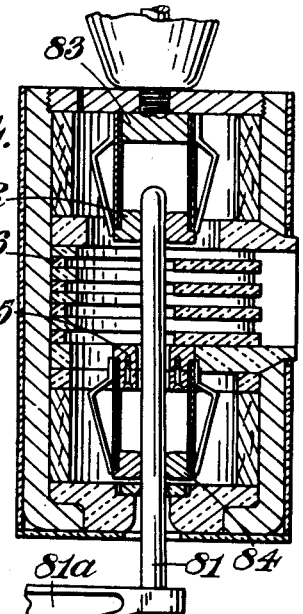
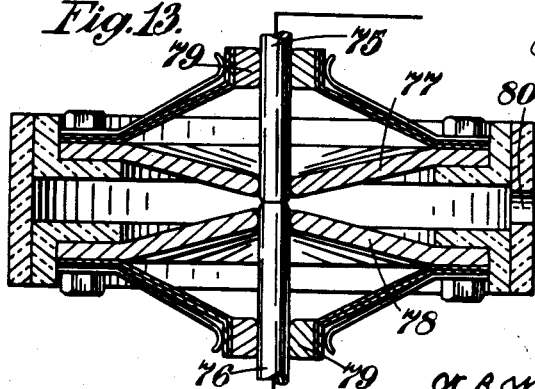

Inventors:
W. B. Whitney +
E. B. Wedmore,
by Byrnes, Stebbins,
Parmelee & Blenko, Attys.

Jan. 15, 1935.    W. B. WHITNEY ET AL    1,987,885
ELECTRIC CIRCUIT BREAKER
Filed Feb. 28, 1933    5 Sheets-Sheet 5

Inventors:
W. B. Whitney & E. B. Wedmore,
By Byrnes, Stebbins, Parmelee & Blenko, attys Patented Jan. 15, 1935

UNITED STATES PATENT OFFICE 1,987,885

ELECTRIC CIRCUIT-BREAKER

Willis Bevan Whitney and Edmund Basil Wedmore, London, England, assignors to The British Electrical and Allied Industries Research Association, London, England, a British association Application February 28, 1933, Serial No. 658,982
In Great Britain March 1, 1932

32 Claims. (Cl. 200—148)

The present invention is for improvements in or relating to electric alternating-current circuit-breakers or other arc-rupturing apparatus and is particularly, though not exclusively, applicable to breakers for high-tension power circuits for voltages of 3,300 and upwards, to the highest attainable voltages.

In electric circuit-breakers of the type in which a blast of fluid, generated by the arc or derived from an external source, is employed to extinguish the arc, it is often of great importance to keep the arc as short as possible, first so that it can be kept within the region where the scouring action of the blast is most effective, and secondly, in order to reduce as far as possible the hot arc products which have to be scoured out of the gap when the arc is finally ruptured at zero current. It is often also important after extinguishing the arc at a predetermined short gap to separate the electrodes further in order to secure an adequate insulating barrier between them after the blast has ceased.

For this purpose it has been proposed to provide separating mechanism such that a moving electrode first moves quickly to a preferred gap at which it pauses for a time and then continues its movement to the full open position. This arrangement has certain disadvantages, for example that it necessitates the use of devices such as dashpots, cams and the like which complicate the operating mechanism.

One feature of the present invention relates to circuit-breakers of the type comprising relatively separable electrodes and especially to the arcing electrodes which carry the arc and rupture the circuit on separation. These arcing electrodes may be the main electrodes serving the purpose of carrying the normal load current when the breaker is closed, or, where separate main current-carrying contacts are used, they are the auxiliary or arcing electrodes arranged in parallel with the main current-carrying contacts but arranged to cease contact later than the main contacts whereby the main contacts do not carry the arc and are thereby protected from damage.

Whether the arcing electrodes form the main contacts or the auxiliary arcing electrodes in the sense above described, they will be referred to hereinafter as arcing electrodes to distinguish them from the additional or auxiliary electrode or electrodes which are part of the present invention, although in fact, as described below, in some cases the arc may not come in contact with both of them.

It is known in the prior art to employ a straight through stroke of an arcing electrode through or in contact with an additional electrode to which the arc is transferred and on leaving which a second arc in series is drawn and extended; the additional electrode being so arranged that the blast generated by reason of the first arc acts on the second arc to extinguish it. The present invention is quite different in that the additional electrode is arranged so that the arc transferred to it from the tip of the arcing electrode is in a region already scoured by a blast of fluid and the additional electrode has such extension in the direction of movement of the movable electrode that the electrode does not leave the said additional electrode until the initial arc has been finally extinguished by the said blast at an A. C. current zero so that separation of the arcing electrodes from the said additional electrode at once forms an insulating gap which may or may not be within the blast but which safeguards the apparatus from flash-over when the blast at the first gap has ceased to flow.

To this end the present invention provides in a circuit-breaker of this type an additional electrode which is separated or separable to said predetermined gap from the stationary arcing electrode and which takes the arc during the time required for said pause and is provided with means (e. g. a conducting extension in the direction of movement of the movable arcing electrode) serving to connect it to the movable arcing electrode during the time of said pause but to disconnect it at the end thereof, after extinction of the arc.

According to another feature of the present invention a circuit-breaker comprises a pair of arcing electrodes shaped so as to afford current paths which converge as they approach the arc and diverge as they recede from the arc.

According to yet another feature of the present invention, in circuit-breakers in which an arc is so drawn in a blast of fluid that the blast tends to carry the arc along with it and lengthen it, means are provided, comprising a localized magnetic barrier acting to shorten the arc as compared with its length without such barrier so that, especially at heavy currents and during the heavy-current position of current waves, the arc is prevented from lengthening up the vent chimney or chimneys, thereby minimizing the quantity of arc products to be swept away by the blast.

Figure 15:
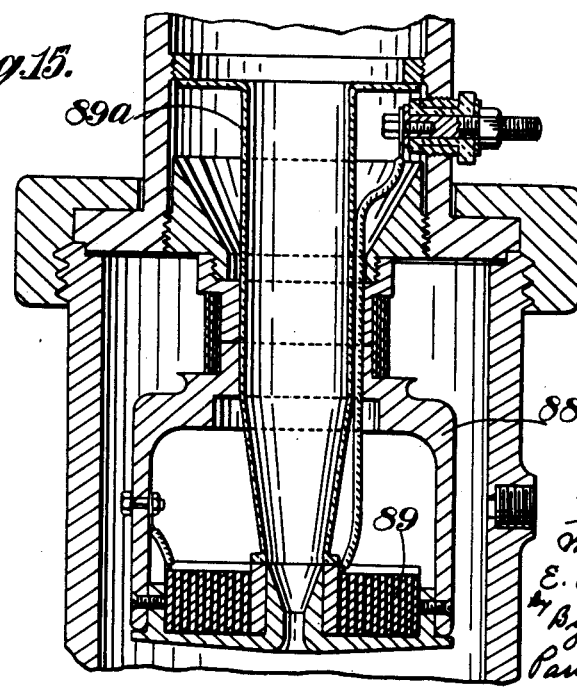
Figure 16:
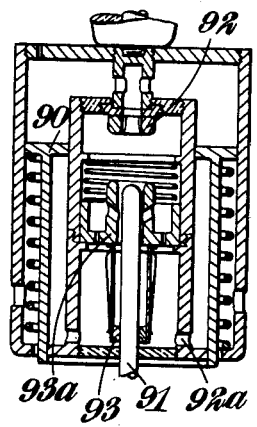
Figure 17:
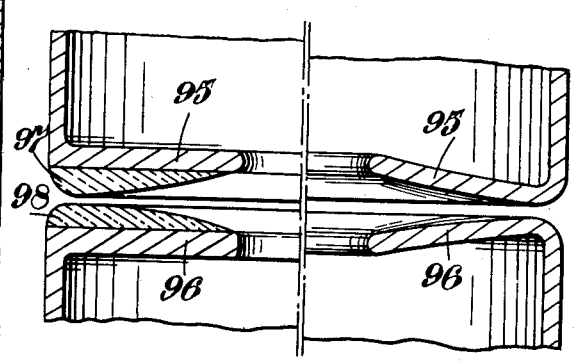
Figure 18:
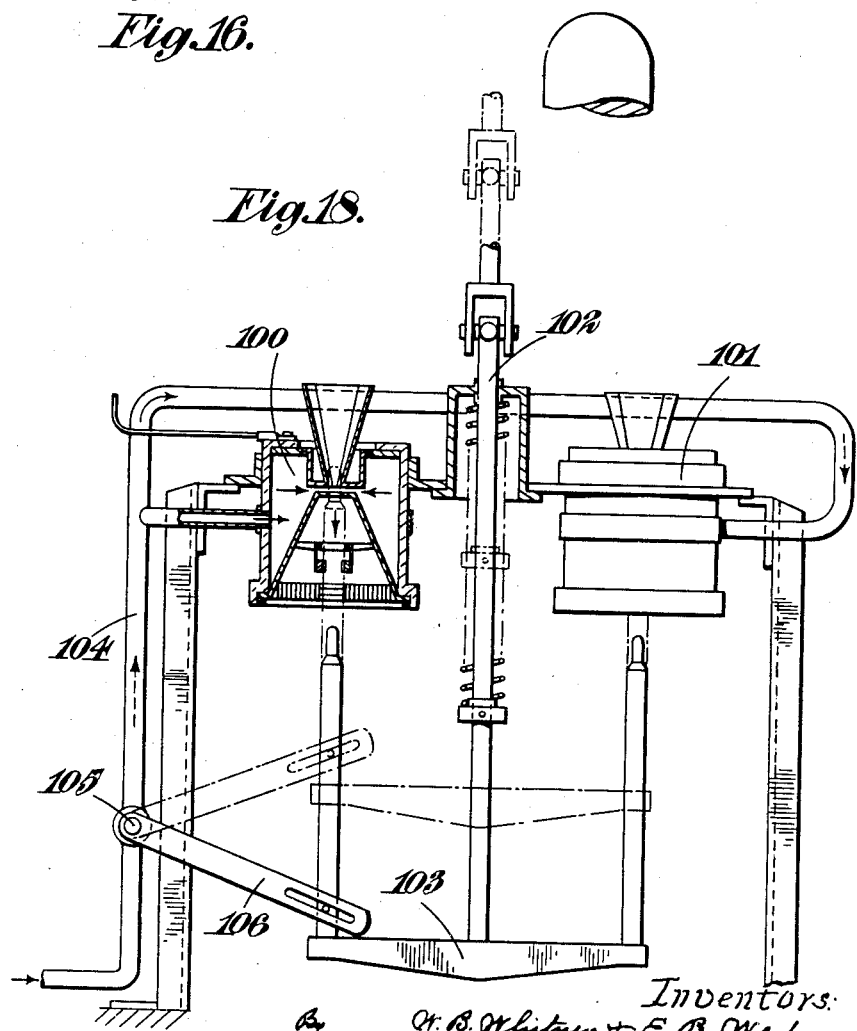

Specific examples of the present invention will now be described with reference to the accompanying diagrammatic drawings of which Figure 1 is a circuit-breaker in accordance with the invention, Figures 2, 3, 4 and 5 are modified forms of circuit-breaker, Figure 6 shows the shape of a plate of magnetic material for use in the construction of Figure 5, Figures 7, 8 and 9 show modified constructions,
Figures 10 and 11 are detail views of Figure 8,
Figures 12, 13, 14 and 15 show further modified constructions,
Figure 16 shows a construction employing a differential piston to produce a blast,
Figure 17 shows a construction of electrode faces in accordance with the invention, while
Figure 18 is a diagrammatic view showing the general assembly of a circuit-breaker according to the invention.

With reference first to Figure 1, a fixed electrode is constituted by a casing 10 having a flared outlet 11 and a cylindrical body portion 12. Inside the body 12 is a spider 13 of insulating material having a central ring 14 which carries a split conducting ring 15 which acts as the auxiliary electrode fixed to the insulating spider by screws 16. Below the conducting ring 15 is a spring-pressed conducting finger 17 having a brush portion 18 which bears against the movable electrode making electrical contact therewith.

The movable arcing electrode is constituted by a rod 19 slidable in the ring 15 which is spaced away from it by a short distance, and is adapted, when in the closed position, to make contact with the throat portion of the container 10 and to close the outlet 11.

The apparatus described above operates as follows. The breaker is operated to withdraw the movable electrode 19 downwardly. An arc will be struck between the throat portion of the contact 10 and the tip of the electrode 19. Then the electrode 19 passes below the ring 15, the arc is transferred to the ring and the electrode 19 continues its downward movement but remains, for a certain time, in contact with the brush 18. This gives in effect a pause in the extension of the arc gap although no pause actually occurs in the movement of the electrode 19; the movable electrode 19 may be withdrawn at a constant speed. During this part of the operation of the switch a blast of fluid from the inlet 20 is caused to pass from the container 12 through the throat 10 and then the flared passage 11. This blast of fluid ruptures the arc at the next zero of current, following the instant that the tip of the electrode 19 enters the ring 15, in known manner. As described hereunder the distance between the ring 15 and the brush 18 is such that at the speed of contact-movement in use, the tip of the electrode 19 will take at least a time equal to a cycle of the A. C. current (in circuits liable to asymmetrical short circuits) to reach the brush 18, so that even on a totally asymmetrical current wave a zero value of current will be reached and the arc between 10 and 15 finally extinguished before the tip of the electrode 19 leaves the brush 18. When the electrode 19 finally leaves the brush 18, by which time the arc has been ruptured, it can pass out of the container 10 and is then completely isolated from it and there is no possibility of the arc restriking after the blast has ceased.

The ring 15 of Figure 1 may be constructed of sectors of 90° each having insulation between them.

Figure 2:
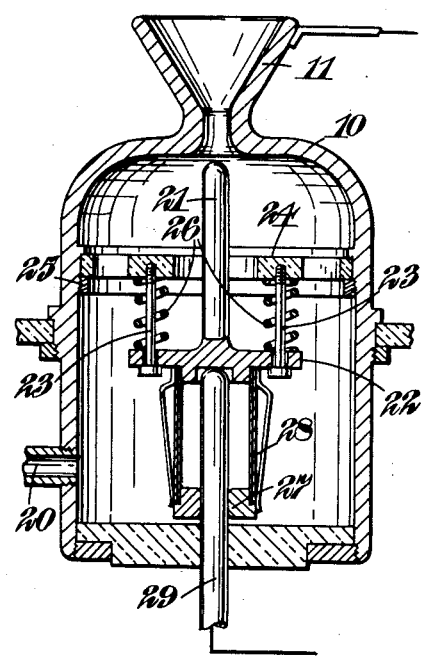

In the modified form of construction shown in Figure 2 the movable electrode 21 which acts as the additional electrode has a flange portion 22 which is slidable on bolts 23 fixed in a spider 24 of insulating material held into the outer casing 10 by a screwed ring 25. The electrode 21 is pressed downwardly by compression springs 26. The electrode 21 carries at its lower end a set of brushes 27 pressed inwardly by means of springs 28 to grip a second movable electrode 29. Fluid under pressure to rupture the arc is admitted by an inlet 20 as in Figure 1.

The apparatus of Figure 2 operates as follows. When the electrode 29 is first drawn down the springs 26 withdraw the electrode 21 from the throat in the casing 10 and an arc strikes at this point. Upon further downward movement of the electrode 29 the electrode 21 remains stationary but remains electrically connected to the electrode 29 by the brushes 27. Finally, the electrode 29 is withdrawn from the brushes 27 and by this time the arc will have been quenched by the blast of fluid over the arcing surfaces of the electrode 21 and the throat portion of the casing 10.

Figure 3:
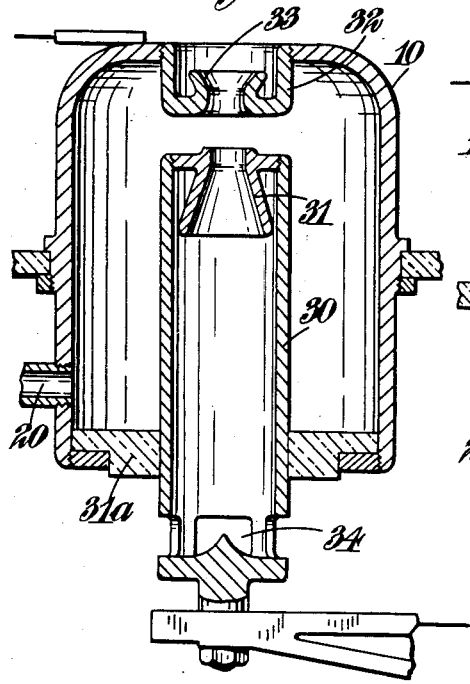

In the construction shown in Figure 3 the movable arcing electrode 30 is in the form of a hollow body slidable in a bottom cover 31a of insulating material fixed to the casing 10. The top of the electrode 30 is formed flat and a depending conical portion 31 is screwed into the aperture. A fixed contact 32 is screwed into the top of the casing 10 and takes the form of a cylindrical body with a flat under face and an internal conical portion 33. The inlet to the electrode 32 and the top end of the conical portion 31 are formed of suitable shape to make good electrical contact when the electrodes are closed. When the electrode 30 is drawn down an arc is struck between it and the electrode 32 but by reason of the shape of the end face of the electrode the current to the arc must flow inwardly in order to reach it. Thus, in whichever position the arc strikes there will be an inward force acting upon it. This force tends to prevent the arc from moving outwardly from the axis of the electrodes. This force is due to the well known phenomenon by which a current-carrying conducting-path tends so to lengthen itself as to embrace a greater field.

Upon actuation of the switch shown in Figure 3 a blast of fluid enters the apertures in both electrodes and escapes out of the top of the casing and out of ports 34 in the bottom of the moving electrode 30. It will be seen that the blast of fluid, as it approaches the arc, is guided inwardly by the flat ends of the electrodes 30 and 32 in all directions from the region outside the electrodes.

Figure 4:
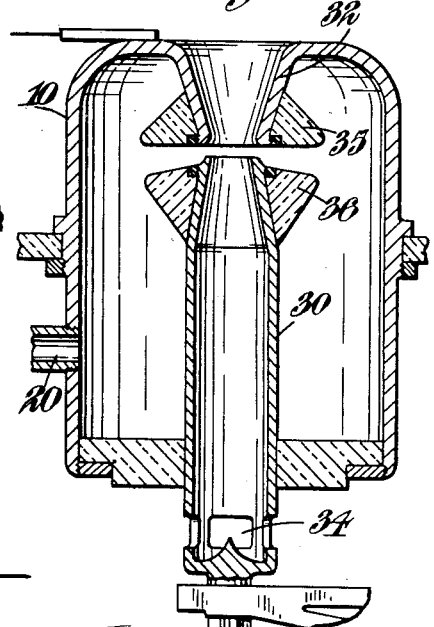

In the modified construction shown in Figure 4 the fixed electrode 32 and the moving electrode 30 are provided with guides 35 and 36 of insulating material which cause the blast of fluid to converge on to the arc in a centripetal stream and the quenching fluid together with the arc products escape as before out from the aperture in the fixed electrode and the ports 34 in the movable electrode. The insulating material prevents the escape of the arc roots from the central region.

In the construction of Figure 1, the movable electrode passes through an aperture constituted by the additional electrode and at this stage if the arc current is heavy enough for the arc to fill the aperture the arc is transferred from the movable arcing electrode to the additional electrode. If, however, at the time when the tip of the moving electrode enters the additional electrode, the arc current is not heavy enough for the arc to fill the aperture, then the arc may be drawn down through the aperture without being transferred to the additional electrode. To remove this possibility, it is desirable to use a cross-magnetic field acting as a barrier to drive the arc to the wall of the passageway which extends through the additional electrode or to use a grid or the like in the arc path close to the arcing position to prevent extension of the arc even at small currents. Such a grid could conveniently be inserted in Figure 1 in the flared outlet 11.

In the construction shown in Figure 5 illustrating the magnetic barrier above described, a moving electrode 19 moves through a ring 15, which constitutes an additional electrode as in the construction of Figure 1, and a brush 18 electrically connected to the ring 15 bears against the electrode 19 being pressed towards it by a spring 17. The fixed electrode is constituted by a double cone 37 screwed into the top of the casing 10 and the movable electrode 19 is preferably split as shown at 38 to enable it to make contact with the fixed electrode in resilient manner.

The electrode 37 and the ring 15 are each provided with a peripheral groove into which is inserted a series of thin soft iron plates 38A which may be of the shape shown in Figure 6. When the electrode 19 is withdrawn from the electrode 37 an arc is struck which, when the electrode 19 passes below the ring 15, is transferred to the ring 15. Any tendency of the arc thus formed to bow upwardly into the passage in the electrode 37 or to be drawn down into the inside of the ring 15 is counteracted by these iron plates which attract the arc against the side of the electrode.

In the construction of Figure 5 it will be seen that the lower part of the fixed electrode 37 is so shaped as to guide the quenching fluid inwardly to quench the arc.

A construction of circuit-breaker incorporating all the main features set out above, is shown in Figure 7. A fixed electrode is constituted by a radially-split ring 39 the segments being pressed inwardly by a surrounding spring 40. The fixed contact is connected by flexible strips 41 to the top cover-plate 42 of the switch. A conical outlet 43 is provided from which the products of arcing escape to the atmosphere.

The moving electrode 44 makes contact with the fixed electrode 39 and with an auxiliary contact 45 in the form of a ring which is a short distance below the fixed contact. The ring 45 is supported on a cone 46 which carries a spider 47 to support brushes 48 similar in action to those illustrated in Figure 2. The lower part of the cone 46 is occupied by a cooling grid 49 which consists of a spiral of conducting material. The underside of the contact 39 and the top of the cone 46 are formed as flat faces. This construction operates as follows.

As soon as the tip of the electrode 44 leaves the contact 39 an arc is struck. When the electrode passes below the top surface of the cone 46 the arc is transferred to the ring 45. It will be seen that the current, in reaching the arc, must flow inwardly towards the axis of the electrodes and in leaving the arc, must flow outwardly away from the axis. The result is that an electro-magnetic force is set up which acts radially and inwardly on the arc whereby it is constrained towards the centre of the region between the two flat faces aforesaid. Moreover, the two flat faces guide the cooling gas radially inwardly whereby the arcing surfaces are washed with gas at high velocity and the arc thereby extinguished. When the electrode 44 leaves the ring 45 the gas proceeds to flow downwardly into the cone 46, and quenching of the arc is thereby expedited. The electrode 44 remains in electrical contact with the ring 45 until it has passed below the brushes 48. The arc will, by this time, have been extinguished. The contact 44 is formed with a conical surface abutting against the ring 45, thereby minimizing the escape of gas. Should it be desired to retain gas under pressure within the arcing enclosure before the movable electrode opens. In this case top contact 39 and the tip of the electrode 44 would be suitably modified to make a gas-tight joint between them and the tip of the electrode 44.

The electrode 39 and the ring 45 are furnished with inserts 50 and 51 of magnetic material which operate in the manner described with reference to Figure 5.

Some check tests were made at 500 amperes at a voltage of about 20,000 volts across single break of a breaker of the general type shown in Figure 7. The upper part of the moving arcing electrode had a diameter of only ⅜" and engaged with a vent outlet in the top fixed electrode of the same diameter passing through an aperture in the additional electrode of slightly greater diameter. The predetermined gap between the fixed venting and the additional electrode was only 8 millimetres. In these tests with an air blast pressure of under 4 atmospheres (above atmospheric pressure) the arcs were extinguished in from half to one cycle. In these tests a magnetic barrier was used in the additional electrode only. The length of contact making portion in the vent outlet of the top electrode was approximately ⅜" and the length of widening passage above this was approximately 1". With regard to the length of the predetermined gap and considering the case where one or both electrodes are tubular and one or both electrodes are surrounded by an additional electrode or electrodes which act as vents for the escape of fluid from the arc gap, the area of ingress to the vent passageway at the least gap between opposing surfaces of the additional electrode and the counter-electrode (where only one electrode is hollow) or between the two additional electrodes (where both electrodes are hollow) should for the best results be less than that of the total effective cross-sectional area of the adjacent throat or throats of the vent passage or vent passages, thus enabling the highest fluid velocity to be maintained between the arcing surfaces so that, over a considerable area, they are washed by a stream flowing radially inwards towards the axis of the electrodes from all sides at high velocity which may be arranged to be substantially uniform over the whole area washed. If the available gas pressure is not sufficiently high to prevent re-arcing across a gap of such dimensions, a slightly larger gap will have to be used.

An indication of a lower limit for the gap G is given by the distance at which a voltage equal to that applied at zero current will just spark across the same gap but through the uncontaminated fluid at room temperature with the fluid moving at the same velocity and with the same pressure gradient as would have occurred had prior arcing been taking place.

In general if S is the striking distance (usually somewhat greater than the lower limit indicated above) it is advisable to make the gap G such that G=S plus a factor of safety, the factor of safety being introduced to allow for possible accidental introduction of dust particles or formation of metallic beads which might partially bridge the gap.

Another alternative construction of circuit-breaker showing a combination of the main features set out above with some additional features is shown in Figures 8 and 9, Figure 9 being a view of part of the breaker in its opened position. A movable electrode 52 consists of a tubular member having a radial spider 53, at the end of each arm of which is a vertical sleeve 54 slidable on a fixed rod 55 and spring-pressed downwardly by springs 56. The spider 53 also carries main contacts 57 which co-operate with contacts 58 fixed to the top cover of the switch. Arranged above the spider 53 and spring-pressed upwardly therefrom is an additional electrode constituted by a metal box 59 which may be built of segments as described later. The bottom of the box has bolts 60 affixed to it which are guided in the spider 53 and which at their lower end carry segments 61 of a resilient ring contact surrounding the electrode 52.

At the lower end of the contact 52 there is a series of brushes 62 inwardly pressed against another electrode 63, which may be mounted directly on an actuating cross-bar in known manner.

This construction of switch operates as follows. The electrode 63 is moved downwardly and the spider 53 follows it being pressed downwardly by the springs 56. The auxiliary electrode 59, however, being pressed upwardly by the spring 64 remains in contact with the top cover of the switch. However, when the lower edge of the spider 53 reaches the lower ends of the bolts 60 the auxiliary electrode 59 begins to move down together with the electrode 52 until the position shown in Figure 9 is reached. When the sleeves 54 reach the bottom of the guides 55 movement of the electrode 52 ceases but the electrode 63 continues to move and finally breaks contact with the brushes 62, to prevent possibility of restriking when the blast has ceased.

The auxiliary electrode 59 may be constructed as shown in Figures 10 and 11, that is to say its top face may consist of a number of sectors 64 separated by radial strips 65 of insulating material. As shown in Figure 11 the strips 65 project upwardly by a small distance above the level of the top of the electrode. The reason for this construction is to cause the current, once the arc has struck a particular point on the electrode 59 to flow radially towards the arc thus increasing the magnetic effect whereby the arc is caused to travel inwards in the manner already described with reference to Figure 3. By making the insulating strips a little higher than the surrounding metal the possibility of electrical connection between adjacent sectors, by reason of burning, is minimized.

The top cover of the switch which, at its centre, constitutes the fixed arcing electrode is formed with a conical outlet 66 and laminated iron inserts 67 may be provided as in the construction of Figure 5. The contact 52 may be arranged so that in the full open position it is just below the top surface of the electrode 59, in which case the arc will probably be transferred to the latter. The contact 52 may also be solid in which case the only outlet for the blast is through the conical outlet 66. Either the contact 66 or the electrode 52 may be made resilient to enable good contact to be made.

The electrode 52 may be made smaller than the passage in the electrode 66 in which case the arc will start between the opposed faces of the electrode 59 and the electrode 66.

Figure 12:
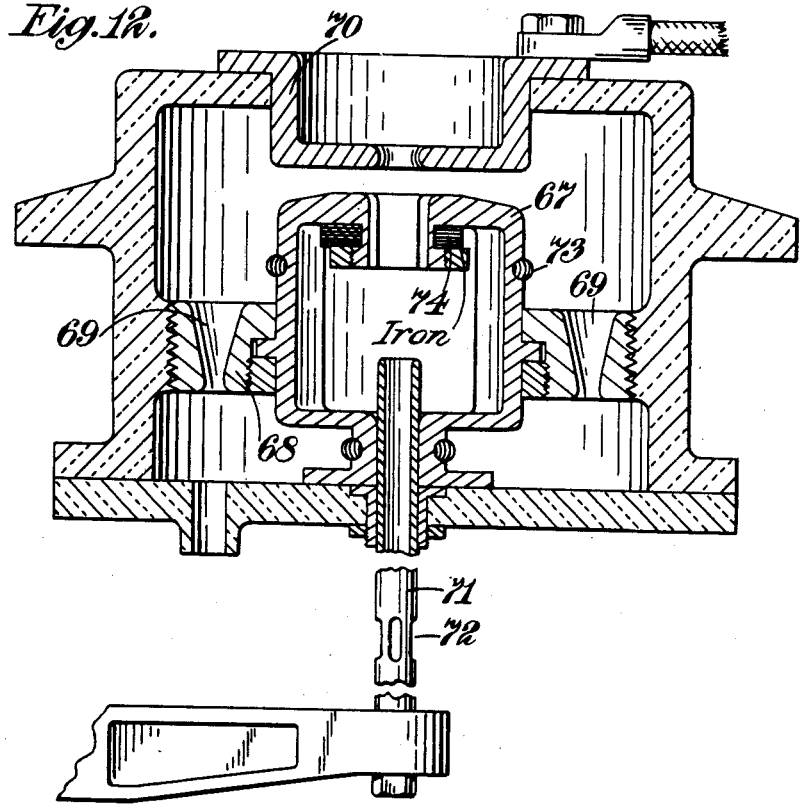

In the alternative construction shown in Figure 12 a fixed additional electrode 67 in the form of a hollow body is mounted on a horizontal partition 68 having a series of apertures 69 through which fluid can flow. The fixed electrode 70 is constituted by a dished plate let into the top of the switch-casing and having a central aperture with which a tubular movable electrode 71 can make contact. The electrode 71 has a series of outlet ports 72 at its lower end through which the products of arcing can escape.

The additional electrode 67 takes the form of a shell built in four sectors held together by a spring 73 and on the inside of the aperture is an insert 74 of laminated iron which, in the manner hereinbefore described, prevents the arc from being drawn downwardly into the interior of the electrode 67.

If it is further desired to ensure that the arc roots shall remain as near as possible to the axis of the moving electrode, the outer margins of arcing surfaces of the hollow bodies such as 67 and 70 in Figure 12 may be protected by insulating material. Use of insulating material in this manner has the additional advantage that the arc roots are retained at a position towards which the current is converging and where it is of greater intensity than at the outer circumferences of the hollow bodies. Further the opposing surfaces of the relatively fixed electrodes need not be parallel but may recede from or approach each other from the centre towards the outer periphery.

In the modified construction shown in Figure 13 there are two arcing electrodes 75 and 76 each passing through an aperture in a conical plate 77, 78, these plates constituting the ends of the cylindrical switch containers. Each electrode has pressed against it a series of brushes 79 connected to the plates 77 and 78 respectively. Gas under pressure is admitted through a port 80 in the periphery of the casing.

In the operation of the switch illustrated in Figure 13 electrodes 75 and 76 are separated and a blast of gas flows through the apertures in the plates 77, 78 and the arc is thereby quenched. The electrodes 75 and 76 remain in electrical contact with their plates 77 and 78 until they have passed beyond the brushes 79 so that the arc remains between the plates 77 and 78.

Figure 14 shows the invention applied to a breaker of a different general type in which the vent is at right-angles to the axis of movement of the electrodes.

A movable electrode 81 is carried on an actuating arm 81a in the usual manner and co-operates with brushes 82 of a fixed contact 83 connected to the top cover-plate of the switch. Below the fixed contact and spaced away therefrom is another set of brushes 84 which grip the electrode 81 and place it in electrical contact with a ring 85, which constitutes an additional electrode. The space between the ring 85 and the brushes 82 is occupied by a series of plates 86 of insulating material arranged to form a series of transverse outlets. When an arc is formed between the electrode 81 and the brushes 82 fluid is forced over the arcing surfaces to extinguish the arc. The latter, if still persisting, is transferred to the ring 85 when the electrode 80 passes below it.

In yet another construction, shown in Figure 15, the fixed electrode 88 has a coil of metal strip 89 spirally wound round its orifice as shown. The ends of the strip are connected by cable in series with the main current. The effect of this coil is to cause the arc to rotate about the axis of the electrode so that it does not tend to burn, and fasten upon, one particular spot. The lower surface of the electrode is shaped as in the construction of Figure 8 which is particularly suitable for incorporating an arc-spinning device. The hot gases are prevented from coming into contact with the cable by a funnel of heat-resistant insulating material 89a.

In the construction shown in Figure 16, the arc is extinguished by a differential piston 90. When the electrode 91 is drawn down out from engagement with the fixed electrode 92 a blast of fluid is forced upwardly through the hollow electrode 92 to quench the arc. If now the moving contact 91 descends too quickly and there is any tendency to excess pressure, the force of the fluid driven through the ports 92a will lift the additional electrode 93a and the arc will be transferred to this electrode from the electrode 91, thus shortening the arc and so preventing undue liberation of energy and excess pressure. Brushes 93 remain in contact with the electrode 91 to give the equivalent of a pause in the operating stroke of the breaker.

Figure 17 shows modified forms of the electrodes of Figure 7 in which the inward radial velocity of the gas is kept substantially constant. The left-hand side of Figure 17 shows metal surfaces 95, 96 covered with insulating material 97, 98 which is tapered to form an increasing gap towards the centre. The right-hand side of Figure 17 shows a case in which no insulating material is used but the surfaces of the electrodes 95, 96 are coned to give the same effect.

It will be seen that in this construction, apart from loss of head due to eddy and friction and other effects, the inward velocity of fluid in the case of a liquid could be the same at all parts from the least gap at the periphery, inwards. The profile required for the left-hand side of Figure 17 to give this result is a matter of simple calculation. In the case of both liquid and gas it may be advantageous to arrange for the least gap at the periphery to be such that the cross-section increases inwardly towards the axis according to some given relationship, linear or otherwise.

In an alternative construction to that shown in Figure 17, one face only may be covered with insulating material of the desired profile.

Figure 18 is a diagram showing a general arrangement convenient for mounting the circuit-breakers above described. Two circuit-breaking units 100 and 101 are arranged in series and an operating rod 102 controls a cross-bar 103 carrying the movable electrodes. A supply pipe 104 feeds quenching fluid to each of the units and a cock 105 may be controlled by a lever 106 connected by a pin-and-slot linkage to one of the movable electrodes or any other mechanism.

We claim:—

1. Electric circuit-breaker having two thin metallic plates or shells symmetrically disposed about a common axis and spaced apart from each other along said axis at least during arc rupture and having means to initiate an arc between their central regions and current connections to the plates so disposed that current flowing into one end of the arc stream converges upon it from the periphery of one plate or shell and diverges from the other end of the arc stream towards the periphery of the other plate or shell and means to rupture the said arc.

2. A circuit-breaker comprising a pair of arcing electrodes shaped so as to afford current paths which converge from a peripheral ring of conducting material as they approach the arc and diverge to a separate peripheral ring as they recede from the arc and having a centrally-disposed passageway with an entrance throat of circular cross-section through which fluid from the arc gap escapes axially along one of said electrodes and in which the cross-sectional area of the said throat is a small fraction of the area enclosed by the periphery of either of said rings.

3. Fluid-blast arc-rupturing apparatus comprising a pair of arcing electrodes, each of which forms a passageway, or part of a passageway, serving as a vent for the products of arcing, the adjacent ends of the passageways forming during arcing the opposing walls of a wide disc-like region to direct a blast of fluid from the periphery thereof inwardly towards the arcing surfaces, means for producing said blast from outside the electrodes, wiping the arcing surfaces aforesaid, flowing into the adjacent ends of the passageways and escaping therefrom, and means independent of the blast of fluid to hinder the movement of the arc roots outwardly away from the center of the region between the adjacent ends of the passageways.

4. Fluid-blast arc-rupturing apparatus comprising a pair of co-operating arcing electrodes, an additional electrode, separated or separable from one of the arcing electrodes to a predetermined arcing gap, means for moving the other arcing electrode beyond the said gap and means for electrically and mechanically connecting it to the additional electrode for a predetermined period of time but to disconnect it at the end of that period and means to scour by a blast of fluid the arcing surfaces of the additional electrode and the said arcing electrode from which it is separated.

5. A circuit-breaker comprising a pair of co-operating arcing electrodes each of which has in it a passageway serving as a vent for hot arc products, means for producing a blast of fluid from outside the electrodes wiping the arcing surfaces of the electrodes and flowing into the adjacent ends of the passageways and through the latter wherein the opposed surfaces of the electrodes are substantially flat and parallel to each other and together form a passageway for the fluid as it approaches the arcing surfaces, of which passage a wall is continuous with each electrode and the gap between such walls is substantially uniform.

6. An electric circuit-breaker comprising a pair of co-operating arcing electrodes each of which has in it a passageway serving as a vent for hot arc products, means for producing a blast of fluid wiping the arcing surfaces of the electrodes and flowing into the adjacent ends of the passageways and through the latter, wherein the opposed surfaces of the electrodes are substantially flat and parallel to each other and together form a passageway for the fluid as it approaches the arcing surfaces, of which passage a wall is continuous with each electrode and the gap between such walls gradually tapers.

7. Fluid-blast arc-rupturing apparatus comprising a pair of fixed arcing electrodes each of which has in it a venting passageway, means for producing a blast of fluid from outside the electrodes wiping the arcing surfaces of the electrodes and flowing into and through the passageways, means to guide the blast inwardly towards the arcing surfaces and a movable electrode extending within both passageways to bridge them in the closed position of the apparatus and to be withdrawn from one electrode through the other to strike an arc between them when the apparatus is opened.

8. Fluid-blast arc-rupturing apparatus comprising a fixed arcing electrode, a movable electrode, an additional electrode separated or separable to a predetermined arcing gap from the fixed arcing electrode, means for moving the movable arcing electrode beyond the said gap and a conducting surface extending along the path of travel of the movable arcing electrode and serving to connect it electrically and mechanically to the additional electrode for a period such that the effective arc gap between the fixed and movable electrodes will remain unaltered at its predetermined value for at least a time corresponding to one and a half cycles of the current with which the apparatus is to be used, and to disconnect it at the end of that period.

9. Apparatus according to claim 4 wherein the one arcing electrode and the additional electrode are both hollow and wherein, in the closed position, the other arcing electrode closes both apertures while during the opening movement fluid is allowed to flow out through the apertures.

10. Apparatus according to claim 4, wherein the additional electrode is mounted so that the predetermined gap at which it remains stationary is adjustable, and a pressure-operated device is provided whereby said gap is automatically adjusted in accordance with the pressure produced by the arc.

11. An electric circuit-breaker comprising a pair of fixed co-operating arcing electrodes each of which has in it a passageway acting as a vent for arc products, means for producing a blast of fluid from outside the electrodes wiping the arcing surfaces of the electrodes and flowing into the adjacent ends of the passageways and through the latter, surfaces spreading outwardly from the arc gap to guide the blast inwardly towards the arcing surfaces, and a coil situated coaxially within one of the electrodes and connected in series with the electrodes so as to rotate the arc about the axis of the electrodes.

12. Fluid-blast arc-rupturing apparatus according to claim 3, wherein the opposing walls of the disc-like region are formed by thin metallic discs or shells to and from the peripheries of which the current flowing through the arc is led.

13. Fluid-blast arc-rupturing apparatus according to claim 3, wherein the disc-like region lies between faces of insulating material.

14. Fluid-blast arc-rupturing apparatus according to claim 3, wherein the walls by which the disc-like region is bounded, are so shaped in axial section in relation to the gap between them at the instant of final arc extinction that the effective area for fluid ingress near their periphery is equal to or less than the total effective areas of the outlet passageways.

15. Fluid-blast arc-rupturing apparatus according to claim 3, wherein the walls by which the disc-like region is bounded are so shaped in axial section in relation to the gap between them at the instant of final arc extinction that the inward radial velocity of fluid flow is substantially uniform throughout the greater part of the said region.

16. Electric circuit breaker having two thin metallic plates or shells symmetrically disposed about a common axis and spaced apart from each other along said axis at least during arc rupture, means to initiate an arc between their central region comprising a movable terminal electrode passing through a central aperture in one of the said plates to make contact with the other plate in the closed position of the breaker and said electrode being arranged on opening the breaker to continue its movement for a time in electrical and mechanical contact with a conducting extension from the said apertured plates, current connectors to the said plates so disposed that current flowing into one end of the arc stream converges upon it from the periphery of one plate or shell and diverges from the other end of the arc stream towards the periphery of the other plate or shell.

17. Fluid-blast arc-rupturing apparatus according to claim 7 comprising a coil situated coaxially within one of the electrodes and connected in series with that electrode so as to rotate the arc about the axis of the electrodes and wherein the least distance between exposed conducting surfaces of the fixed electrodes is less than twice the diameter of the blast aperture in either of the electrodes at its smallest cross section.

18. Arc-rupturing apparatus for extinguishing arcs by fluid blast in which an end of the arc is blown through a blast outlet in at least one of a pair of electrodes and wherein magnetizable material is arranged in the said electrode to one side of the blast outlet whereby a field is produced which forces the escaping part of the arc against a wall of the blast outlet to minimize further extension of the arc.

19. Fluid-blast arc-rupturing apparatus comprising two electrodes one of which is movable with respect to the other and makes sliding contact with it in the closed position, a cylindrical member slidably mounted on and surrounding the said movable electrode, resilient means urging the cylindrical member towards the arcing end of the movable electrode during separation of the electrodes and means to prevent further relative movement between the cylindrical member and the movable electrode after the cylindrical member has reached a position such that its end face is substantially flush with the said arcing end and means to create a blast of fluid flowing from all sides radially into the arc gap between the electrodes and washing the arcing end of the movable electrode.

20. Fluid-blast arc-rupturing apparatus according to claim 3, wherein the disc-like region lies between faces of insulating material and wherein a movable electrode extends through the passageway in one of the pair of electrodes to make contact with the other electrode and to be withdrawn from the latter through the first-mentioned electrode to initiate an arc between them.

21. Fluid-blast arc-rupturing apparatus according to claim 3, wherein the walls by which the disc-like region is bounded, are so shaped in axial section in relation to each other, that the effective area for fluid ingress near the periphery is equal to or less than the total effective areas of the outlet passageways and wherein a movable electrode extends through the passageway in one of the pair of electrodes to make contact with the other electrode and to be withdrawn from the latter through the first-mentioned electrode to initiate an arc between them.

22. Fluid-blast arc-rupturing apparatus according to claim 3, wherein the disc-like region is so shaped that the inward radial velocity of fluid flow is substantially uniform throughout the greater part of the said region and wherein a movable electrode extends through the passageway in one of the pair of electrodes to make contact with the other electrode and to be withdrawn from the latter through the first-mentioned electrode to initiate an arc between them.

23. Fluid-blast arc-rupturing apparatus comprising a pair of arcing electrodes each of which forms a passageway, or part of a passageway, serving as a vent for the products of arcing, the adjacent ends of the passageways forming during arcing the opposing walls of a wide disc-like region to direct a blast of fluid from the periphery thereof inwardly towards the arcing surfaces, means for producing said blast from outside the electrodes, wiping the arcing surfaces aforesaid, flowing into the adjacent ends of the passageways and escaping therefrom, and means independent of the blast of fluid to hinder the movement of the arc roots outwardly away from the center of the region between the adjacent ends of the passageways, wherein one at least of said electrodes has an annular ridge closely surrounding the throat of its passageway and protruding longitudinally therefrom so as to make butt contact with the other electrode in the closed position of the breaker and so as to be the last part to separate therefrom an opening of the breaker, and means to move at least one of the electrodes to make contact with the other electrode on closing the breaker and to separate therefrom on opening circuit.

24. Electric circuit breaker having two thin metallic plates or shells symmetrically disposed about a common axis and spaced apart from each other along said axis at least during arc-rupture and having means to initiate an arc between their central regions and current connections to the plates so disposed that current flowing into one end of the arc stream converges upon it from the periphery of one plate or shell and diverges from the other end of the arc stream towards the periphery of the other plate or shell, wherein at least one of the plates or shells has a central aperture and means are provided for forcing a blast of fluid radially inwards between the plates and out through the central aperture or apertures.

25. Electric arc-rupturing apparatus for extinguishing an arc by fluid blast in which means are provided for lengthening the arc close to and substantially parallel with a conductor and wherein magnetizable material is arranged in said conductor whereby a field is produced which tends to force the arc against said conductor to minimize further extension of the said arc.

26. Arc-rupturing apparatus according to claim 25 wherein the magnetic field produced is asymmetrical with relation to the axis of the passageway and operates with maximum intensity close to but slightly down-stream of the point of commencement of arcing.

27. Electric circuit-breaker according to claim 1 wherein the means for initiating an arc comprises a moving terminal electrode which continues its movement in contact with an extension from one of the electrodes during the time in which a pause in extension of the arc gap is taking place and finally separates therefrom.

28. Electric circuit-breaker according to claim 24 wherein a conducting extension for one or both outlets is provided with magnetizable material to minimize longitudinal extension of the arc outside and axial to the central region of the blast.

29. Fluid blast arc-rupturing apparatus comprising a pair of co-operating arcing electrodes each of which forms a passageway or part of a passageway serving as a vent for the products of arcing, means to initiate an arc between the arcing surfaces in the central region between the adjacent ends of the passageways, means for producing a blast of fluid from outside the electrodes washing the arcing surfaces and flowing into the adjacent ends of the passageways and escaping therethrough and blast guiding means for the gap between the adjacent ends of the passageways, which blast guiding means spreads outwardly from the said arcing surfaces at the end of said gap and forms during arcing the opposing walls of a flat annular disc-like region of uniform thickness.

30. Fluid-blast arc-rupturing apparatus comprising a fixed and a movable arcing electrode, an additional electrode separated or separable to a predetermined arcing gap from the fixed arcing electrode, means for moving the movable arcing electrode beyond the said gap and a conducting surface extending along the path of travel of the movable arcing electrode and serving to connect it electrically and magnetically to the additional electrode for a predetermined period but to disconnect it therefrom at the end of that period and means to scour the arcing surfaces of the additional electrode and the said arcing electrode from which it is separated.

31. Arc-rupturing apparatus comprising a pair of fixed co-operating arcing electrodes each of which has in it a passageway acting as a vent for arc products, means for producing a blast of fluid from outside the electrodes wiping the arcing surfaces of the electrodes and flowing into the adjacent ends of the passageways and through the latter, and surfaces spreading outwardly from the arc gap to guide the blast inwardly towards the arcing surfaces and means for initiating an arc between the said arcing electrodes.

32. Electric arc-rupturing apparatus according to claim 25, for extinguishing an arc by fluid blast, wherein the said field is produced by means of a U-shaped body of metallic material, located in an annular groove formed in the material of the conductor.

WILLIS BEVAN WHITNEY.
EDMUND BASIL WEDMORE.